US010163570B2

(12) United States Patent
Aoki et al.

(10) Patent No.: US 10,163,570 B2
(45) Date of Patent: Dec. 25, 2018

(54) POWER STORAGE DEVICE

(71) Applicant: Murata Manufacturing Co., Ltd., Nagaokakyo-shi, Kyoto-fu (JP)

(72) Inventors: Norihisa Aoki, Nagaokakyo (JP); Yasutake Fukuda, Nagaokakyo (JP); Hiroshi Kunimatsu, Nagaokakyo (JP); Yasuhiko Ueda, Nagaokakyo (JP); Kenji Kimura, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/712,527

(22) Filed: Sep. 22, 2017

(65) Prior Publication Data

US 2018/0012704 A1    Jan. 11, 2018

Related U.S. Application Data

(63) Continuation of application No. PCT/JP2016/061123, filed on Apr. 5, 2016.

(30) Foreign Application Priority Data

Apr. 15, 2015 (JP) ................................. 2015-083055

(51) Int. Cl.
*H01G 9/00*  (2006.01)
*H01G 4/30*  (2006.01)
(Continued)

(52) U.S. Cl.
CPC .............. *H01G 4/30* (2013.01); *H01G 11/08* (2013.01); *H01G 11/10* (2013.01); *H01G 11/28* (2013.01);
(Continued)

(58) Field of Classification Search
CPC ........ H01G 11/26; H01G 11/22; H01G 11/24; H01G 4/30; H01G 11/72; H01G 11/08;
(Continued)

(56) References Cited

U.S. PATENT DOCUMENTS

| 9,558,893 B2 | 1/2017 | Horikawa et al. |
| 9,748,046 B2 | 8/2017 | Ueda et al. |
| 9,972,821 B2 * | 5/2018 | Minagata ................ H01M 2/26 |
| 2008/0151472 A1 | 6/2008 | Maletin et al. |
| 2010/0214721 A1 | 8/2010 | Lee et al. |

(Continued)

FOREIGN PATENT DOCUMENTS

| JP | H05-21273 A | 1/1993 |
| JP | 2000-012378 A | 1/2000 |

(Continued)

OTHER PUBLICATIONS

International Search Report issued in International Application No. PCT/JP2016/061122, dated Jun. 21, 2016.

(Continued)

*Primary Examiner* — Angel R Estrada
(74) *Attorney, Agent, or Firm* — Arent Fox LLP (57) ABSTRACT

An electrical double layer capacitor having electrolyte-containing layer between a first polarizable electrode layer and a second polarizable electrode layer. An insulating adhesive portion adheres to a first current collector and a second current collector which at least partially face each other with the electrolyte-containing layer interposed therebetween. The insulating adhesive portion 15 extends around the first and second polarizable electrode layers and the electrolyte-containing layer. A thickness of the electrolyte-containing layer is larger than a difference between a thickness of the insulating adhesive portion and thicknesses of the first and second polarizable electrode layers.

11 Claims, 4 Drawing Sheets

(51) Int. Cl.
*H01G 11/10* (2013.01)
*H01G 11/72* (2013.01)
*H01G 11/78* (2013.01)
*H01G 11/80* (2013.01)
*H01G 11/08* (2013.01)
*H01G 11/28* (2013.01)
*H01G 11/56* (2013.01)
*H01M 2/02* (2006.01)
*H01M 10/04* (2006.01)
*H01M 10/052* (2010.01)
*H01M 10/0585* (2010.01)

(52) U.S. Cl.
CPC ............ *H01G 11/56* (2013.01); *H01G 11/72* (2013.01); *H01G 11/78* (2013.01); *H01G 11/80* (2013.01); *H01M 2/0217* (2013.01); *H01M 2/0257* (2013.01); *H01M 10/0413* (2013.01); *H01M 10/052* (2013.01); *H01M 10/0585* (2013.01); *Y02E 60/13* (2013.01)

(58) Field of Classification Search
CPC ........ H01G 11/28; H01G 11/78; H01G 11/00; H01G 11/80; H01G 11/10; H01G 11/12; H01M 2/263; H01M 2/26; H01M 2/30; H01M 4/34; H01M 4/00
USPC ........................................ 361/502, 500, 517
See application file for complete search history.

(56) References Cited

U.S. PATENT DOCUMENTS

| | | |
|---|---|---|
| 2013/0122350 A1 | 5/2013 | Hagiwara et al. |
| 2014/0062503 A1 | 3/2014 | Behrends et al. |
| 2015/0221448 A1 | 8/2015 | Horikawa et al. |
| 2015/0248970 A1 | 9/2015 | Ueda et al. |
| 2018/0012704 A1 | 1/2018 | Aoki et al. |
| 2018/0025852 A1 | 1/2018 | Aoki et al. |

FOREIGN PATENT DOCUMENTS

| | | |
|---|---|---|
| JP | 2001-68384 A | 3/2001 |
| JP | 2010-34120 A | 2/2010 |
| WO | WO 2011/118418 A1 | 9/2011 |
| WO | WO 2013/001961 A1 | 1/2013 |
| WO | WO 2014/083919 A1 | 6/2014 |
| WO | WO 2014/083925 A1 | 6/2014 |

OTHER PUBLICATIONS

International Search Report issued in International Application No. PCT/JP2016/061123, dated Jun. 21, 2016.
Written Opinion of the International Searching Authority issued in International Application No. PCT/JP2016/061122, dated Jun. 21, 2016.
Written Opinion of the International Searching Authority issued in International Application No. PCT/JP2016/061123, dated Jun. 21, 2016.

* cited by examiner

FIG. 4

POWER STORAGE DEVICE

CROSS REFERENCE TO RELATED APPLICATIONS

The present application is a continuation of International application No. PCT/JP2016/061123, filed Apr. 5, 2016, which claims priority to Japanese Patent Application No. 2015-083055, filed Apr. 15, 2015, the entire contents of each of which are incorporated herein by reference.

FIELD OF THE INVENTION

The present invention relates to a power storage device.

BACKGROUND OF THE INVENTION

A power storage device described in Patent Document 1 includes a first internal electrode extended to a first end surface, a second internal electrode extended to a second end surface, and a separator disposed between the first internal electrode and the second internal electrode. A first external electrode electrically connected to the first internal electrode is disposed on the first end surface. A second external electrode electrically connected to the second internal electrode is disposed on the second end surface. An electrical double layer capacitor described in Patent Document 1 has an advantage that it can be mounted on a mounting substrate.

Patent Document 1: International Publication No. 2014/083919

SUMMARY OF THE INVENTION

In an electrical double layer capacitor as described in Patent Document 1, there is a demand to suppress occurrence of a short circuit failure.

A main object of the present invention is to provide an electrical double layer capacitor in which a short circuit failure is unlikely to occur.

A power storage device according to the present invention includes a device body. The device body has first and second principal surfaces, first and second side surfaces, and first and second end surfaces. The first and second principal surfaces extend along a length direction and a width direction. The first and second side surfaces extend along the length direction and a thickness direction. The first and second end surfaces extend along the width direction and the thickness direction. The device body has a first internal electrode, a second internal electrode, an electrolyte-containing layer, and an insulating adhesive portion. The first internal electrode has a first current collector and a first polarizable electrode layer. In the first internal electrode, at least the first current collector is extended to the first end surface. The first polarizable electrode layer is provided on at least one of both surfaces of the first current collector. The second internal electrode has a second current collector and a second polarizable electrode layer. In the second internal electrode, at least the second current collector is extended to the second end surface. The second polarizable electrode layer is provided on at least one of both surfaces of the second current collector. The electrolyte-containing layer is provided between the first polarizable electrode layer and the second polarizable electrode layer. The insulating adhesive portion adheres to the first current collector and the second current collector which at least partially face each other with the electrolyte-containing layer interposed between the first current collector and the second current collector. The insulating adhesive portion extends around the first and second polarizable electrode layers and the electrolyte-containing layer. A thickness of the electrolyte-containing layer is larger than a difference between a thickness of the insulating adhesive portion and thicknesses of the first and second polarizable electrode layers. Thus, it is possible to effectively suppress contact between the first internal electrode and the second internal electrode. Accordingly, in the power storage device according to the present invention, a short circuit failure is unlikely to occur.

In the power storage device according to the present invention, it is preferable that at least one central portion of the first and second principal surfaces is convex. In this case, when the power storage device is mounted on a mounting substrate such that the convex surface faces upward, a distance from a land of the mounting substrate to an upper end of an end surface of the power storage device is shortened. Thus, ESR can be reduced. That is, according to this configuration, it is possible to suppress an increase in ESR while suppressing the occurrence of a short circuit failure. In this case, an area of an end surface of the device body can be reduced. Accordingly, moisture hardly intrudes into the device body from the end surface of the device body.

The present invention can provide an electrical double layer capacitor in which a short circuit failure is unlikely to occur.

DETAILED DESCRIPTION OF THE INVENTION

Hereinafter, a description will be given of an example of a preferred embodiment of the present invention. However, the following embodiments are provided merely by way of example. The present invention is not limited to the following embodiments.

Throughout the drawings to which the embodiments and the like refer, elements having substantially the same functions will be referred to by the same reference symbols. The drawings to which the embodiments and the like refer are schematically illustrated. The dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

(First Embodiment)

Figure 1:
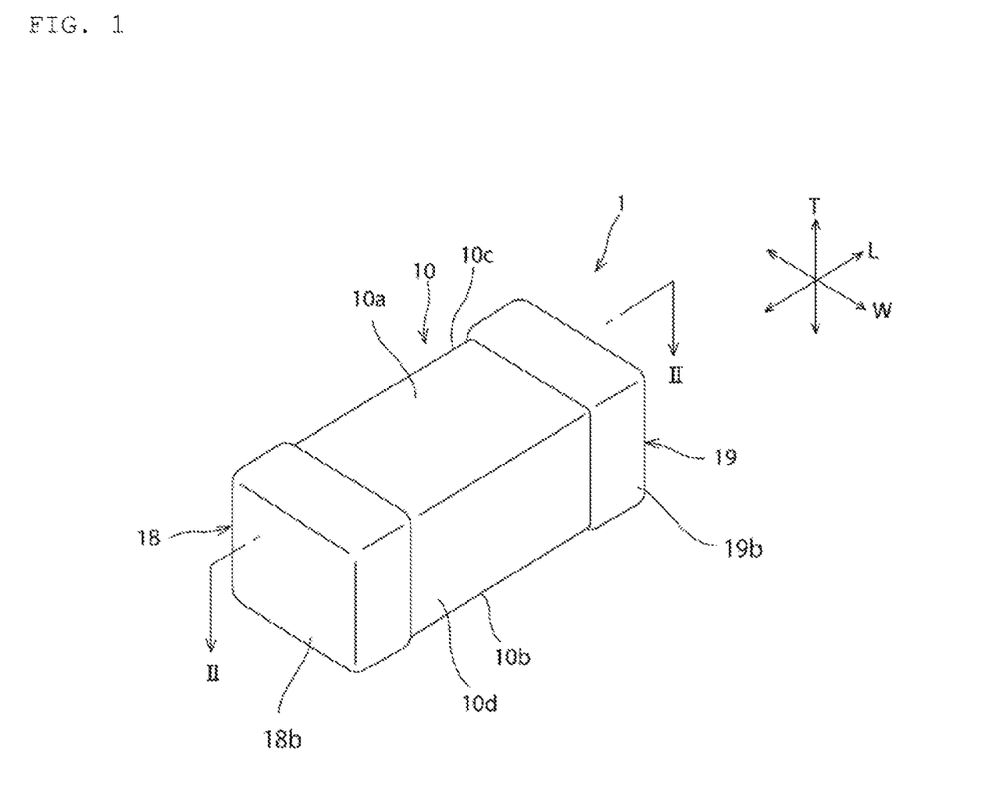
FIG. 1 is a schematic perspective view of a power storage device according to a first embodiment.
Figure 2:
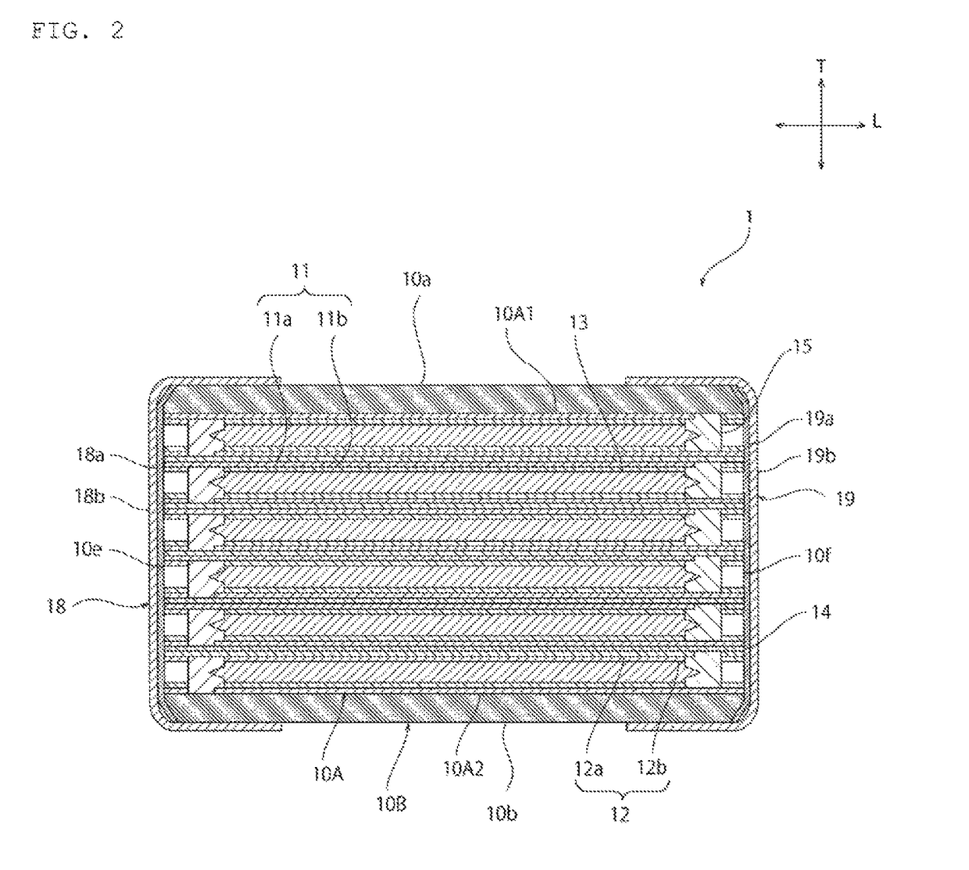
FIG. 2 is a schematic cross-sectional view taken along line II-II of FIG. 1.
Figure 3:
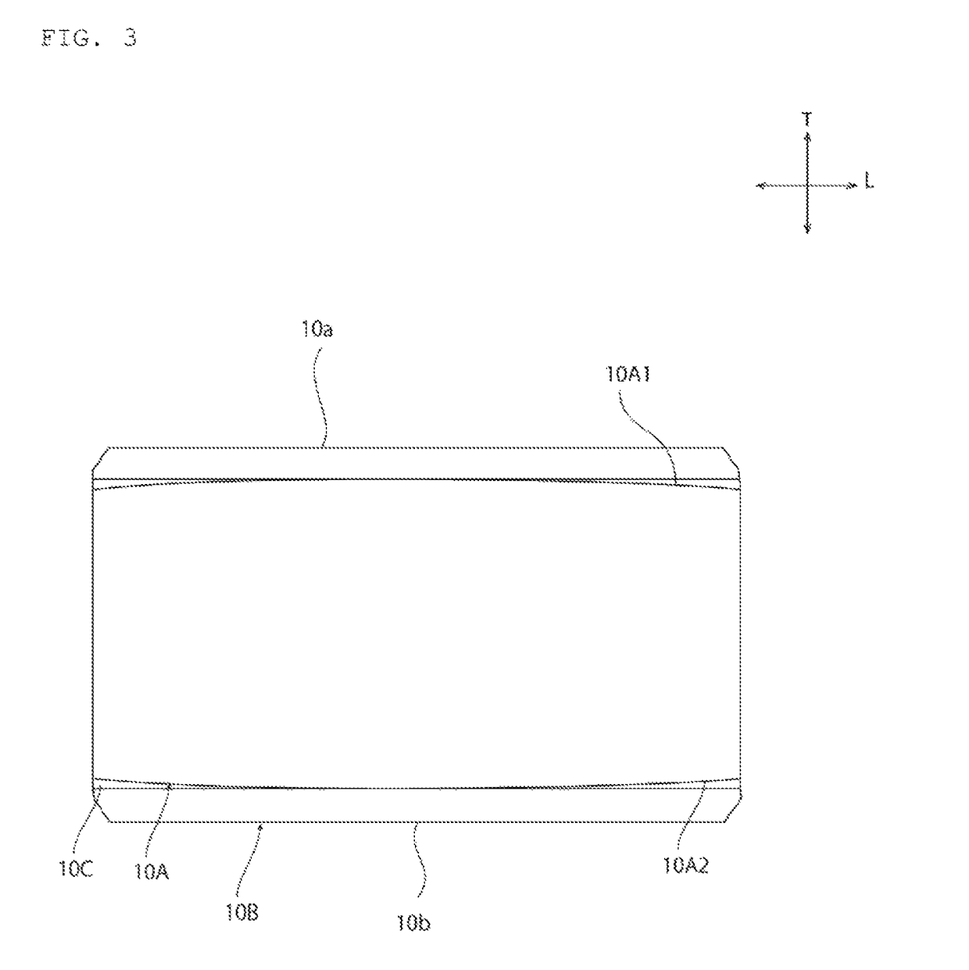
FIG. 3 is a schematic cross-sectional view of the power storage device according to the first embodiment excluding first and second external electrodes.

FIG. 1 is a schematic perspective view of a power storage device according to this embodiment. FIG. 2 is a schematic cross-sectional view taken along line II-II of FIG. 1. FIG. 3 is a schematic cross-sectional view of the power storage device according to the first embodiment excluding first and second external electrodes.

A power storage device 1 shown in FIGS. 1 to 3 is, for example, one of an electrical double layer capacitor and a device constituting a secondary battery.

The power storage device 1 includes a device body 10. The device body 10 has first and second principal surfaces 10a and 10b, first and second side surfaces 10c and 10d, and first and second end surfaces 10e and 10f. The first and second principal surfaces 10a and 10b extend along a length direction L and a width direction W, respectively. The first principal surface 10a and the second principal surface 10b face each other in a thickness direction T. The first and second side surfaces 10c and 10d extend along the length direction L and the thickness direction T, respectively. The first side surface 10c and the second side surface 10d face each other in the width direction W. Each of the first and second end surfaces 10e and 10f extends along the width direction W and the thickness direction T. The first end surface 10e and the second end surface 10f face each other in the length direction L. In the present embodiment, the device body 10 is provided in a substantially rectangular parallelepiped shape.

As shown in FIG. 2, the device body 10 has a plurality of first internal electrodes 11 and a plurality of second internal electrodes 12. The first and second internal electrodes 11 and 12 are alternately provided along the thickness direction T.

The first internal electrode 11 is provided in parallel with the first and second principal surfaces 10a and 10b. At least a part of the first internal electrode 11 is extended to the first end surface 10e. Specifically, in this embodiment, a first current collector 11a, which will be described later, of the first internal electrode 11 is extended to the first end surface 10e.

The first internal electrode 11 is not extended to the second end surface 10f and the first and second side surfaces 10c and 10d.

The first internal electrode 11 has a first current collector 11a and a first polarizable electrode layer 11b. The first polarizable electrode layer 11b is provided on the surface of at least one side of the first current collector 11a. In this embodiment, the first polarizable electrode layer 11b is provided on one surface of the first current collector 11a.

The first current collector 11a can be constituted by a metal foil formed of at least one metal such as aluminum and copper.

The first polarizable electrode layer 11b preferably contains a carbon material such as activated carbon.

The second internal electrode 12 is provided in parallel with the first and second principal surfaces 10a and 10b. At least a part of the second internal electrode 12 is extended to the second end surface 10f. Specifically, in this embodiment, at least a second current collector 12a of the second internal electrode 12 is extended to the second end surface 10f. The second internal electrode 12 is not extended to the first end surface 10e and the first and second side surfaces 10c and 10d.

The second internal electrode 12 has a second current collector 12a and a second polarizable electrode layer 12b. The second polarizable electrode layer 12b is provided on the surface of at least one side of the second current collector 12a. In this embodiment, the second polarizable electrode layer 12b is provided on one surface of the second current collector 12a.

The second current collector 12a can be constituted by a metal foil formed of at least one metal such as aluminum and copper.

In this case, the second polarizable electrode layer 12b preferably contains a carbon material such as activated carbon.

An electrolyte-containing layer 13 is provided between the first polarizable electrode layer 11b and the second polarizable electrode layer 12b. The first polarizable electrode layer 11b and the second polarizable electrode layer 12b face each other with the electrolyte-containing layer 13 interposed therebetween.

The electrolyte-containing layer 13 contains an electrolyte. The electrolyte-containing layer 13 is preferably formed of a gel containing an electrolyte. As the gel, for example, high polymer polyethylene oxide resin or the like can be used.

The device body 10 has a functional portion 10A and a casing 10B. The functional portion 10A is a portion that exhibits a function as a power storage device. The functional portion 10A includes the first and second internal electrodes 11 and 12 and the electrolyte-containing layer 13 described above.

The casing 10B covers a portion of an outer surface of the functional portion 10A. Specifically, the casing 10B covers first and second principal surfaces and first and second side surfaces of the functional portion 10A. First and second end surfaces of the functional portion 10A are exposed from the casing 10B. Accordingly, the first and second principal surfaces 10a and 10b and the first and second side surfaces 10c and 10d are constituted by the casing 10B. The first and second end surfaces 10e and 10f are constituted by the functional portion 10A and the casing 10B.

A first external electrode 18 is provided on the first end surface 10e. The first external electrode 18 is electrically connected to the first internal electrode 11. The first external electrode 18 has a first electrode film 18a and a first metal cap 18b.

The first electrode film 18a is connected to the first internal electrode 11. The first electrode film 18a is provided so as to cover the first end surface 10e. Specifically, the first electrode film 18a covers substantially the entire first end surface 10e. The first electrode film 18a is not located on the first and second principal surfaces 10a and 10b and the first and second side surfaces 10c and 10d.

The first metal cap 18b covers a portion on the first end surface 10e side of the device body 10. Specifically, the first metal cap 18b covers the first end surface 10e and partially covers the first and second principal surfaces 10a and 10b and the first and second side surfaces 10c and 10d on the first end surface 10e side.

The first metal cap 18b is electrically connected to the first electrode film 18a.

A second external electrode 19 is provided on the second end surface 10f. The second external electrode 19 is electrically connected to the second internal electrode 12. The second external electrode 19 has a second electrode film 19a and a second metal cap 19b.

The second electrode film 19a is connected to the second internal electrode 12. The second electrode film 19a is provided so as to cover the second end surface 10f. Specifically, the second electrode film 19a is provided so as to cover substantially the entire second end surface 10f. The second electrode film 19a is not located on the first and second principal surfaces 10a and 10b and the first and second side surfaces 10c and 10d.

The second metal cap 19b covers a portion on the second end surface 10f side of the device body 10. Specifically, the second metal cap 19b covers the second end surface 10e and partially covers the first and second principal surfaces 10a and 10b and the first and second side surfaces 10c and 10d on the second end surface 10f side.

The second metal cap 19b is electrically connected to the second electrode film 19a.

In this embodiment, each of the first and second electrode films 18a and 19a is formed of a sprayed film.

The first and second electrode films 18a and 19a can be formed of, for example, Al, an Al alloy, or the like.

Each of the first and second metal caps 18b and 19b may be formed of, for example, an Fe—Ni alloy, a Cu—Zn alloy, a Cu—Zn—Ni alloy, Al or the like. A plating film may be provided on outer surfaces of the first and second metal caps 18b and 19b. The plating film may be, for example, an Ni/Ag plating film, an Ni/Au plating film, an Ni/Sn plating film, or the like.

In the power storage device 1, as shown in the formula (1), a thickness of the electrolyte-containing layer 13 is larger than a difference between a thickness of the insulating adhesive portion 15 and thicknesses of the first and second polarizable electrode layers 11b and 12b.

$$c > a - b1 - b2 \ldots \quad \text{(Formula 1)}$$

a: the thickness of the insulating adhesive portion
b1: the thickness of the first polarizable electrode layer 11b
b2: the thickness of the second polarizable electrode layer 12b
c: the thickness of the electrolyte-containing layer 13

Thus, a distance between the first internal electrode 11 and the second internal electrode 12 can be increased, and the first internal electrode 11 and the second internal electrode 12 are hardly in contact with each other. Accordingly, in the power storage device 1, a short circuit failure is unlikely to occur.

From the viewpoint of more effectively suppressing the occurrence of a short circuit failure in the power storage device 1, it is preferable that the thickness of the electrolyte-containing layer 13 is 1.1 times or more the difference between the thickness of the insulating adhesive portion 15 and the thicknesses of the first and second polarizable electrode layers 11b and 12b. However, if the electrolyte-containing layer 13 is too thick, the ESR of the power storage device 1 may become too high. Accordingly, it is more preferable that the thickness of the electrolyte-containing layer 13 is 1.3 times or less the difference between the thickness of the insulating adhesive portion 15 and the thicknesses of the first and second polarizable electrode layers 11b and 12b.

If the distance between the first internal electrode 11 and the second internal electrode 12 is increased, electrical resistance between the first internal electrode 11 and the second internal electrode 12 increases. Thus, the ESR of the power storage device tends to increase. In the power storage device 1, since $c > a - b1 - b2$ is satisfied, as shown in FIG. 2, at least one of central portions of first and second principal surfaces 10A1 and 10A2 of the functional portion 10A is constituted by a convex surface. The electrolyte-containing layer 13 is not provided outside the insulating adhesive portion 15. Thus, an area of the functional portion 10A at the end surfaces 10e and 10f is smaller than a cross sectional area at a center in the length direction L of the functional portion 10A. Thus, intrusion of moisture from the end surface of the functional portion 10A into the functional portion 10A is effectively suppressed.

In the power storage device 1, the first principal surface 10a is flatter than the first principal surface 10A1. The second principal surface 10b is flatter than the second principal surface 10A2. The first and second principal surfaces 10a and 10b are each substantially a flat surface. Thus, for example, when the power storage device 1 is mounted, it is easy to take hold of the power storage device 1 with a suction mounter or the like.

A reinforcing member 10C is disposed in a depressed portion between the casing 10B and the functional portion 10A. Strength of the power storage device 1 is increased by the reinforcing member 10C. Accordingly, when the power storage device 1 is mounted using a mounter, the power storage device 1 is less likely to be damaged.

The reinforcing member 10C can be formed of, for example, a thermosetting resin, such as a polyimide resin, an epoxy resin, and a phenol resin, or the like.

Hereinafter, a description will be given of another example of a preferred embodiment of the present invention. In the following description, members having substantially the same functions as those of the first embodiment will be referred to using the same symbols and description thereof will be omitted.

(Second Embodiment)

Figure 4:
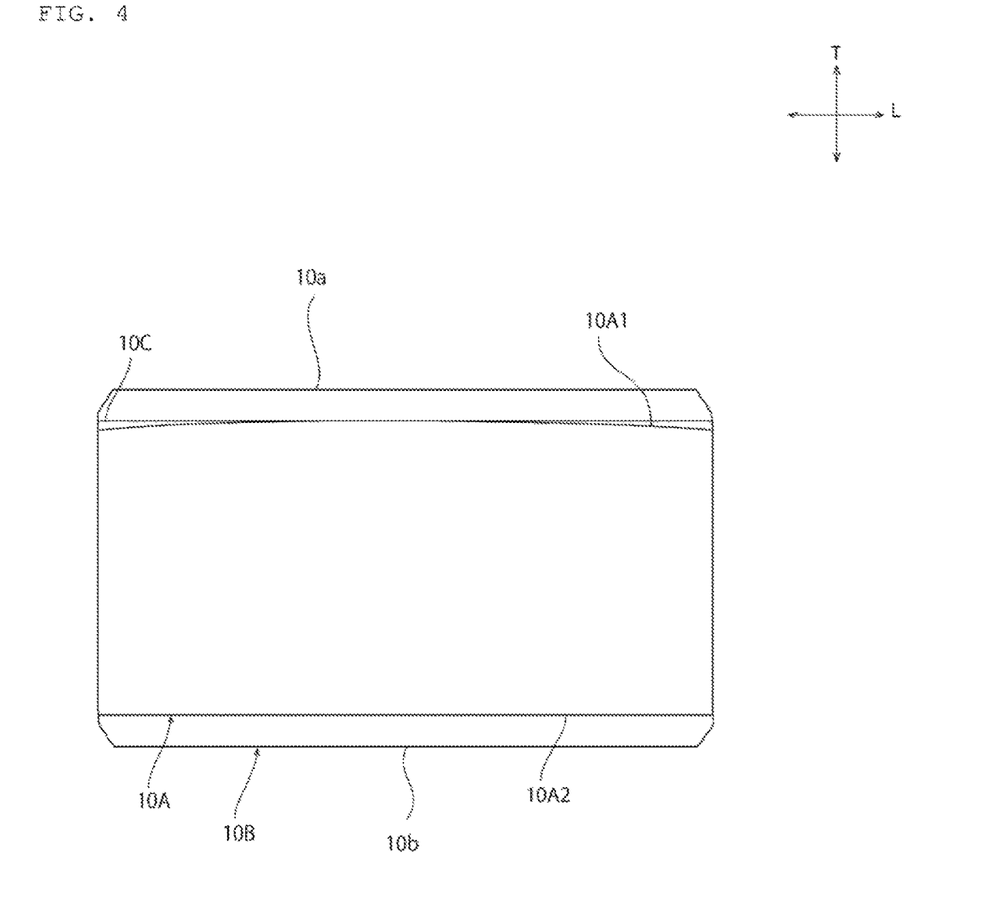
FIG. 4 is a schematic cross-sectional view of a power storage device according to a second embodiment excluding first and second external electrodes.

FIG. 4 is a schematic cross-sectional view of a power storage device according to the second embodiment excluding first and second external electrodes.

In the first embodiment, an example in which the central portions of both the first and second principal surfaces 10a and 10b are constituted by convex surfaces has been described. However, the present invention is not limited to this configuration. For example, the central portion of only one of the first and second principal surfaces 10a and 10b may be constituted by a convex surface. In this case, when the power storage device is mounted on a mounting substrate such that among the first and second principal surfaces 10a and 10b, the principal surface which is a convex surface faces upward, a distance from a land of the mounting substrate to an upper end of the end surface of the power storage device is shortened. Thus, ESR can be reduced.

DESCRIPTION OF REFERENCE SYMBOLS

1: Power storage device
10: Device body
10A: Functional portion
10B: Casing
10a: First principal surface
10b: Second principal surface
10c: First side surface
10d: Second side surface
10e: First end surface
10f: Second end surface
10A1: First principal surface of functional portion
10A2: Second principal surface of functional portion
10C: Reinforcing member
11: First internal electrode
11a: First current collector
11b: First polarizable electrode layer
12: Second internal electrode
12a: Second current collector
12b: Second polarizable electrode layer
13: Electrolyte-containing layer
14: Adhesive layer
15: Insulating adhesive portion
18: First external electrode
18a: First electrode film
18b: First metal cap 19: Second external electrode
19a: First electrode film
19b: Second metal cap

The invention claimed is:

1. A power storage device comprising:
a device body having first and second principal surfaces extending along a length direction and a width direction, first and second side surfaces extending along the length direction and a thickness direction, and first and second end surfaces extending along the width direction and the thickness direction, the device body comprising
a first internal electrode which has a first current collector and a first polarizable electrode layer on at least one surface of the first current collector and the first current collector extends to the first end surface,
a second internal electrode which has a second current collector and a second polarizable electrode layer on at least one surface of the second current collector and the second current collector extends to the second end surface,
an electrolyte-containing layer between the first polarizable electrode layer and the second polarizable electrode layer, and
an insulating adhesive portion adhered to the first current collector and the second current collector and extending around the first and second polarizable electrode layers and the electrolyte-containing layer, wherein
a thickness of the electrolyte-containing layer is larger than a difference between a thickness of the insulating adhesive portion and thicknesses of the first and second polarizable electrode layers.

2. The power storage device according to claim 1, wherein the thickness of the electrolyte-containing layer is 1.1 to 1.3 times the difference between the thickness of the insulating adhesive portion and the thicknesses of the first and second polarizable electrode layers.

3. The power storage device according to claim 1, further comprising:
a first external electrode on the first end surface and electrically connected to the first internal electrode; and
a second external electrode on the second end surface and electrically connected to the second internal electrode.

4. A power storage device comprising:
a device body having first and second principal surfaces extending along a length direction and a width direction, first and second side surfaces extending along the length direction and a thickness direction, and first and second end surfaces extending along the width direction and the thickness direction, the device body comprising:
a first internal electrode which has a first current collector and a first polarizable electrode layer on at least one surface of the first current collector and the first current collector extends to the first end surface,
a second internal electrode which has a second current collector and a second polarizable electrode layer on at least one surface of the second current collector and the second current collector extends to the second end surface,
an electrolyte-containing layer between the first polarizable electrode layer and the second polarizable electrode layer, and
an insulating adhesive portion adhered to the first current collector and the second current collector and extending around the first and second polarizable electrode layers and the electrolyte-containing layer, wherein
a thickness of the electrolyte-containing layer is larger than a difference between a thickness of the insulating adhesive portion and thicknesses of the first and second polarizable electrode layers, and
wherein at least one central portion of the first and second principal surfaces is convex.

5. The power storage device according to claim 4, wherein the device body has
a functional portion comprising the first and second internal electrodes and the electrolyte-containing layer, and
an outer layer portion surrounding the functional portion and forming the first and second principal surfaces and the first and second side surfaces of the device body, wherein
the convex shape of the at least one central portion of the functional portion forms a depressed portion between the functional portion and the outer layer portion, and
the power storage device further comprises a reinforcing member in the depressed portion between the functional portion and the outer layer portion.

6. The power storage device according to claim 5, wherein the reinforcing member comprises a thermosetting resin, an epoxy resin, or a phenol resin.

7. The power storage device according to claim 5, wherein the first principal surface of the device body is flatter than a principal surface of the functional portion.

8. A power storage device comprising:
a device body having first and second principal surfaces extending along a length direction and a width direction, first and second side surfaces extending along the length direction and a thickness direction, and first and second end surfaces extending along the width direction and the thickness direction, the device body comprising:
a first internal electrode which has a first current collector and a first polarizable electrode layer on at least one surface of the first current collector and the first current collector extends to the first end surface,
a second internal electrode which has a second current collector and a second polarizable electrode layer on at least one surface of the second current collector and the second current collector extends to the second end surface,
an electrolyte-containing layer between the first polarizable electrode layer and the second polarizable electrode layer, and
an insulating adhesive portion adhered to the first current collector and the second current collector and extending around the first and second polarizable electrode layers and the electrolyte-containing layer, wherein
a thickness of the electrolyte-containing layer is larger than a difference between a thickness of the insulating adhesive portion and thicknesses of the first and second polarizable electrode layers, and
wherein two opposed central portions of the first and second principal surfaces are convex.

9. The power storage device according to claim 8, wherein the device body has
a functional portion comprising the first and second internal electrodes and the electrolyte-containing layer, and
an outer layer portion surrounding the functional portion and forming the first and second principal surfaces and the first and second side surfaces of the device body, wherein the convex shape of the two opposed central portions of the functional portion form depressed portions between the functional portion and the outer layer portion, and the power storage device further comprises a reinforcing member in the depressed portions between the functional portion and the outer layer portion.

10. The power storage device according to claim 9, wherein the reinforcing member comprises a thermosetting resin, an epoxy resin, or a phenol resin.

11. The power storage device according to claim 9, wherein the first principal surface of the device body is flatter than a principal surface of the functional portion.

* * * * *